United States Patent
Li (10) Patent No.: US 10,971,101 B2
(45) Date of Patent: Apr. 6, 2021

(54) LIQUID CRYSTAL DISPLAY AND MOBILE TERMINAL

(71) Applicant: SHENZHEN CHINA STAR OPTOELECTRONICS SEMICONDUCTOR DISPLAY TECHNOLOGY CO., LTD., Guangdong (CN)

(72) Inventor: Wenying Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 232 days.

(21) Appl. No.: 16/308,779

(22) PCT Filed: Aug. 1, 2018

(86) PCT No.: PCT/CN2018/098114
§ 371 (c)(1),
(2) Date: Dec. 10, 2018

(87) PCT Pub. No.: WO2019/232907
PCT Pub. Date: Dec. 12, 2019

(65) Prior Publication Data
US 2020/0320948 A1 Oct. 8, 2020

(30) Foreign Application Priority Data
Jun. 6, 2018 (CN) .......... 201810575032.2

(51) Int. Cl.
*G09G 3/36* (2006.01)
*G02F 1/1368* (2006.01)
*G02F 1/136* (2006.01)

(52) U.S. Cl.
CPC .......... *G09G 3/3677* (2013.01); *G02F 1/1368* (2013.01); *G02F 1/13606* (2021.01);
(Continued)

(58) Field of Classification Search
None
See application file for complete search history.

(56) References Cited

U.S. PATENT DOCUMENTS

2006/0290630 A1 12/2006 Kim
2007/0096102 A1 5/2007 Kwak
(Continued)

FOREIGN PATENT DOCUMENTS

| CN | 103995387 A | 8/2014 |
| CN | 106502014 A | 3/2017 |
| CN | 107112364 A | 8/2017 |

OTHER PUBLICATIONS

International Search Report issued in corresponding International Application No. PCT/CN2018/098114, dated Feb. 28, 2019, pp. 1-9.

*Primary Examiner* — Aneeta Yodichkas
(74) *Attorney, Agent, or Firm* — Leong C. Lei (57) ABSTRACT

The present disclosure relates to a liquid crystal display (LCD) having a substrate and at least one scanning controller. the substrate is configured with a plurality of thin film transistors (TFTs). Each of the TFTs includes a gate, a drain and a pixel electrode, and the gate of each of the TFTs electrically connecting to the scanning controller along a first direction in sequence. One end of the drain connects to the pixel electrode, and the other end of the drain is stacked on the gate along a third direction perpendicular to the substrate. The drain is insulated from the gate, and a dimension of a projection area of the drain on the gate along the third direction increases when a distance between the
(Continued)

TFT and the scanning controller in the first direction increases.

20 Claims, 5 Drawing Sheets

(52) U.S. Cl.
CPC ........... *G09G 2310/0283* (2013.01); *G09G 2320/0233* (2013.01); *G09G 2320/0247* (2013.01)

(56) References Cited

U.S. PATENT DOCUMENTS

| | | | |
|---|---|---|---|
| 2010/0301329 A1* | 12/2010 | Asano | H01L 29/42384 |
| | | | 257/43 |
| 2013/0120230 A1* | 5/2013 | Chen | G09G 3/20 |
| | | | 345/92 |
| 2014/0055503 A1* | 2/2014 | Jung | G09G 5/10 |
| | | | 345/690 |

\* cited by examiner

LIQUID CRYSTAL DISPLAY AND MOBILE TERMINAL

CROSS-REFERENCE TO RELATED APPLICATION

This application is a National Phase of International Application Number PCT/CN2018/098114, filed Aug. 1, 2018, and claims the priority of Chinese Patent Application No. 201810575032.2, entitled "Liquid crystal display and mobile terminal", filed on Jun. 6, 2018, the disclosure of which is incorporated herein by reference in its entirety.

FIELD OF THE INVENTION

The present disclosure relates to a liquid crystal display, and more particularly to a liquid crystal display having a thin film transistor (TFT) matrix, and the mobile terminal having the liquid crystal display.

BACKGROUND OF THE INVENTION a large-sized high-resolution panel, a liquid crystal display produced by a conventional driving method has a wide phenomenon of flickering screen. One important reason is that the power line itself has electrical resistance and a slight voltage drop occurs along the direction of the power line. The voltage (Vp) on the pixel electrode changes due to the capacitive coupling effect, especially for the locations away from the signal input end. In particular, the flicker phenomenon is more obvious, resulting in uneven brightness of the liquid crystal display and affecting the display effect.

SUMMARY OF THE INVENTION

The present disclosure relates to a technical solution for controlling a flicker phenomenon of a liquid crystal display by adjusting a parasitic capacitance (Cgd).

In one aspect, a liquid crystal display (LCD) includes: a substrate and at least one scanning controller, the substrate being configured with a plurality of thin film transistors (TFTs), each of the TFTs comprising a gate, a drain and a pixel electrode, the gate of each of the TFTs electrically connecting to the scanning controller along a first direction in sequence, one end of the drain connecting to the pixel electrode, and the other end of the drain being stacked on the gate along a third direction perpendicular to the substrate, the drain being insulated from the gate, and a dimension of a projection area of the drain on the gate along the third direction increases when a distance between the TFT and the scanning controller in the first direction increases.

Wherein a stacked area of the drain and the gate in the third direction is a rectangle, two adjacent sides of the rectangle respectively extends along the first direction and a second direction, the second direction is perpendicular to the first direction, a length of the side extending along the first direction remains the same when the dimension of the projection area has been increased.

Wherein the LCD further includes two scanning controllers respectively connecting to the TFTs in two regions of the substrate to control the TFTs, and the projection area of the TFTs in each of the regions is configured to be in a sequential increment manner basing on a distance between the TFT and the connected scanning controller.

Wherein the two scanning controllers are respectively configured at two sides defined by the first direction, the two regions of the substrate is divided by a center line in the first direction such that at least one pair of TFTs are respectively configured at the corresponding locations in the two regions with respect to the center line, and the dimensions of the projection area of the two corresponding TFTs are the same.

Wherein the LCD further includes a data controller, the TFT comprises a source, the data controller electrically connects to the source along the second direction in turn, and the dimensions of the projection areas of the TFTs are configured to be increased in turn, along the second direction, according to the distance between the TFT and the data controller.

Wherein the source is opposite to the drain, and a channel is disposed between the source and the drain, and a length of the channel remains the same.

Wherein the source is opposite to the drain, and a channel is disposed between the source and the drain, and a length of the channel is configured to be gradually decreased when then dimension of the projection area has been gradually increased.

Wherein the LCD includes two data controllers electrically connecting to the TFTs in the two regions of the substrate so as to control the TFTs, and the dimension of the projection area of each of the TFTs in the two regions has been gradually increased according to the distance between the TFT and the connected data controller.

Wherein the LCD includes two data controllers electrically connecting to the TFTs in the two regions of the substrate so as to control the TFTs, and the dimension of the projection area of each of the TFTs in the two regions has been gradually increased according to the distance between the TFT and the connected data controller.

Wherein the two scanning controllers are respectively configured at two sides defined by the second direction, the two regions of the substrate is divided by a center line in the second direction such that at least one pair of TFTs are respectively configured at the corresponding locations in the two regions with respect to the center line, and the dimensions of the projection area of the two corresponding TFTs are the same.

In another aspect, a mobile terminal includes the above LCD.

In view of the above, the scanning controller electrically connected to the gates of the plurality of TFTs in the first direction, so that the scan controller sequentially controls the TFTs in the first direction. One end of the drain connects to the pixel electrode such that the drain may control the voltage at the pixel electrode. By stacking the other end of the drain and the gate to form the projection area, the parasitic capacitance is formed. By, along the first direction, increasing the size of the projection area, the parasitic capacitance has been gradually increased, thereby gradually increasing the parasitic capacitance of the TFT farther from the scan controller in the first direction. As such, the capacitive coupling effect caused by the parasitic capacitance may affect the balance. The distance between the TFT and the scanning controller is not affected, and the display consistency and balance of the liquid crystal display may be improved.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

The following descriptions for the respective embodiments are specific embodiments capable of being implemented for illustrations of the present invention with referring to appended figures.

Figure 1:
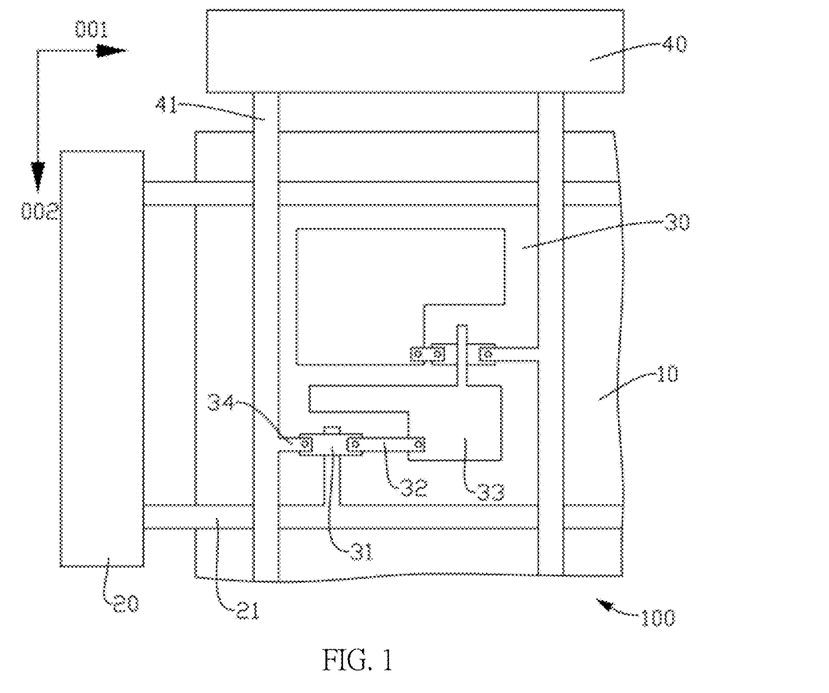
FIG. 1 is a schematic view of the liquid crystal display (LCD) in accordance with one embodiment of the present disclosure.
Figure 2:
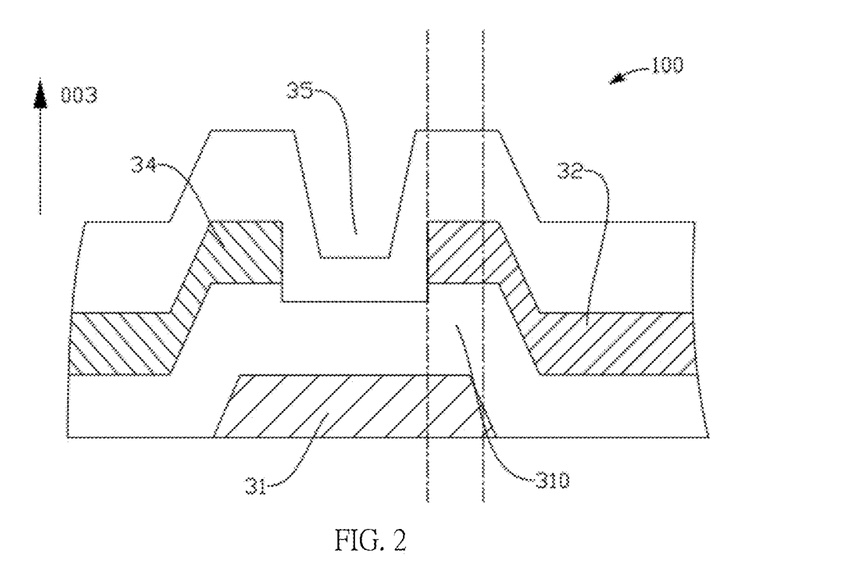
FIG. 2 is a cross sectional view of the LCD in accordance with one embodiment of the present disclosure.

As shown in FIG. 1, the LCD 100 includes a substrate 10 and a scanning controller 20. The substrate 10 is configured as a carrier of the LCD 100. The substrate 10 is configured with a plurality of TFTs 30 arranged thereon, Usually, the TFTs 30 are arranged on the substrate 10 in a matrix. The TFT 30 includes a gate 31, a drain 32, and a pixel electrode 33. The scanning controller 20 electrically connects to the gates 31 along a first direction 001. It can be understood that the gate 31 and the scanning controller 20 are connected by the power line. The gate 31 is configured to turn on the drain 32. One end of the drain 32 connects to the pixel electrode 33, and the other end 322 of the drain 32 engages with the gate 31. Referring to FIG. 2, the other end 322 of the drain 32 is stacked on the gate 31 along a direction perpendicular to a third direction 003 of the substrate 10, and an insulation layer 40 is configured between the drain 32 and the gate 31. A dimension of a projection area 310 of the drain 32 on the gate 31 along the third direction 003 determines the parameters of the parasitic capacitance (Cgd) of the TFTs 30.

During the operations of the TFTs 30, the scanning controller 20 issues the scanning signals, which are transmitted to the TFTs along the first direction 001 in turn by the scanning line 21. As the scanning line 21 has resistance, the voltage generated by the TFTs 30 along the first direction 001 may be decreased. That is, the dropped voltage ΔVg increases when the distance between the scanning controller 20 and one specific TFT increases. For this reason, the dropped voltage ΔVp on the pixel electrode 33 also decreases in sequence. As such, the brightness of the LCD 100 may not be uniform.

Figure 3:
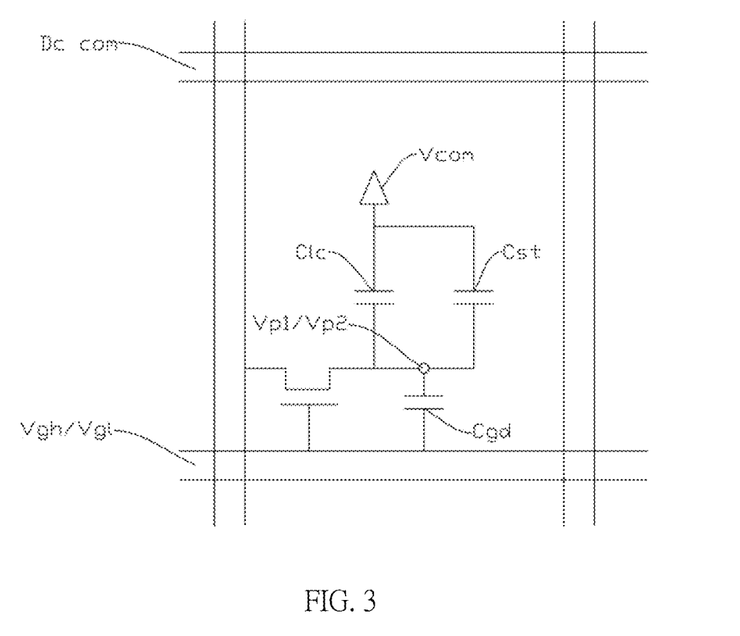
FIG. 3 is a circuit diagram of the TFTs in accordance with one embodiment of the present disclosure.

Specifically, regarding the capacitive coupling effect, FIG. 3 shows the circuit diagram of the TFTs 30. The capacitance in the TFT 30 includes a liquid crystal capacitor (Clc), a holding capacitor (Cst), and a parasitic capacitance (Cgd). In the two states in which the TFT switch is turned on and off, according to the law of charge inactivation "Q=C×V", the following equation can be obtained:

$(Vp1-Vgh) \times Cgd + (Vp1-Vcom) \times (Clc+Cst) = (Vp2-Vgl) \times Cgd + (Vp2-Vcom) \times (Clc+Cst)$ Wherein Vp1 and Vp2 are voltages of the pixel electrodes when the TFT switch is turned on and off, respectively, and Ugh and Vgl are voltages of the scan lines when the TFT 30 is turned on and off, respectively. The voltage drop at the display electrode is derived from the above equation as:

$$\Delta Vp = \frac{Cgd}{Cgd + Clc + Cst} \times \Delta Vg$$

Wherein ΔVg relates to the voltage drop when the TFT 30 is turned on and off. It can be seen that the parasitic capacitance (Cgd) has a great influence on the capacitive coupling effect, Therefore, for the voltage drop caused by the resistance of the power line itself, the voltage drop of the thin film transistor which is different from the power supply source may be different, and a difference ΔVg may also occur, which is an important reason for the uneven brightness of the LCD 100.

According to the above formula, if the parasitic capacitance (Cgd) is sequentially increased along the first direction 001, the influence of the voltage drop (ΔVg) caused by the scanning line 21 can be cancelled. The value at the electrode 33 makes the capacitive coupling effect of the entire LCD 100 more uniform, and the phenomenon of uneven brightness of the screen can be effectively limited. Thus, along the first direction 001, the farther away from the TFT 30 of the scanning controller 20 is, the larger the projection area 310 is, and the parasitic capacitance can be increased. The LCD 100, which is sequentially disposed, also obtains a more balanced brightness effect and enhances the user's perception.

Figure 4:
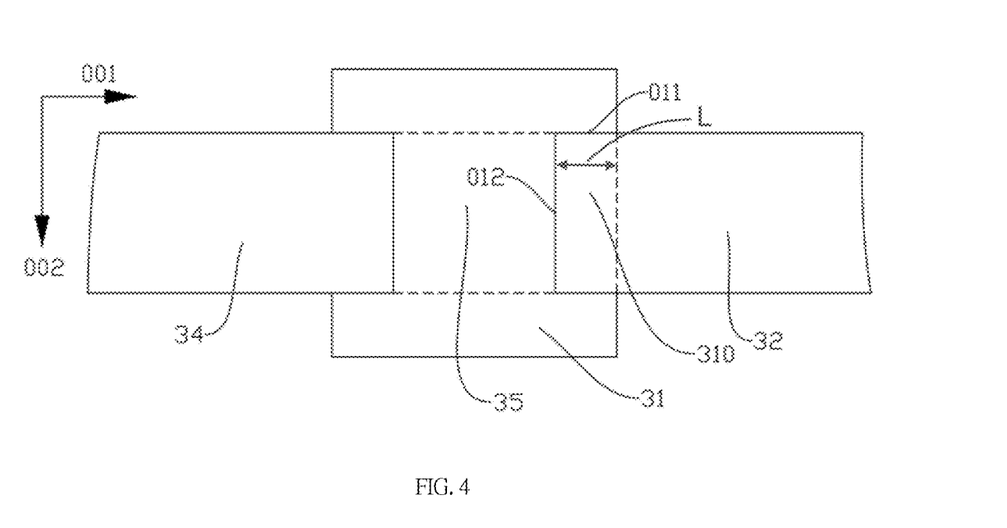
FIG. 4 is a partial view of the LCD in accordance with one embodiment of the present disclosure.

Referring to FIG. 4, in general, a stacked area of the drain 32 and the gate 31 in the third direction 003 is a rectangle 01. Two adjacent sides of the rectangle 01 extend along the first direction 001 and a second direction 002 perpendicular to the first direction 001, respectively. That is, one side 011 of the rectangle 01 extends along the first direction 001, and the other side 012 adjacent to the side 011 extends along the second direction 002.

It can be understood that the second direction 002 is a direction for which the current flows through the drain 32, and the first direction is the width of the drain 32. The width of the drain 32 is related to the threshold voltage of the TFT 30, the reaction time, and the like. If the size of the other side 012 is changed when the projection area 310 is changed, the parameters of the TFT 30 will be affected. To this end, in an embodiment, in order to balance the parameters of the TFT 30, during the increase of the projection area 310, the size of the other side 012 is not changed, and only the side is increased.

Figure 5:
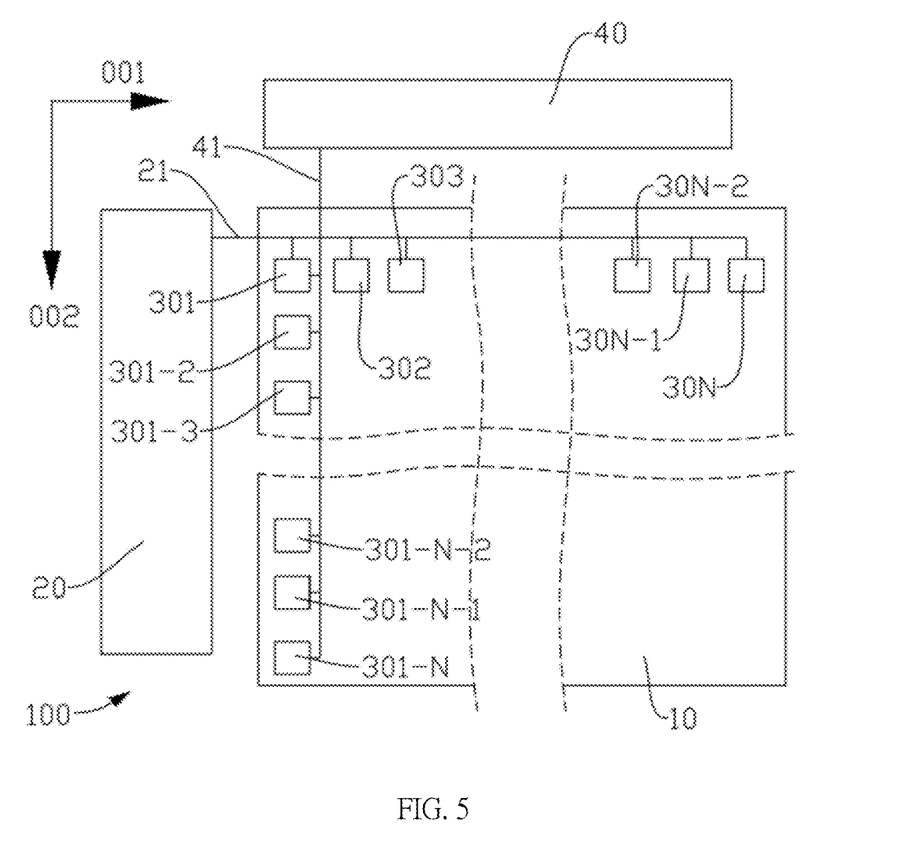
FIG. 5 is a schematic view of the LCD in accordance with another embodiment of the present disclosure.

Specifically, as shown in FIG. 5, a plurality of rows of the TFTs 30 are arranged on the substrate 10 along the first direction 001. The scanning controller 20 is configured on one side of the substrate 10 in the first direction 001. A row of the TFTs 30 is respectively defined as a transistor 301, a transistor 302, a transistor 303, a transistor 30N-2, a transistor 30N-1, and a transistor 30N in the first direction 001. Correspondingly, the side 011 of each of the TFTs 30 has a size L. Then, the size of the side 011 of the entire row of the TFTs 30 should satisfy the following conditions:

L301<L302<L303< ... L30N-2<L30N-1<L30N

Figure 6:
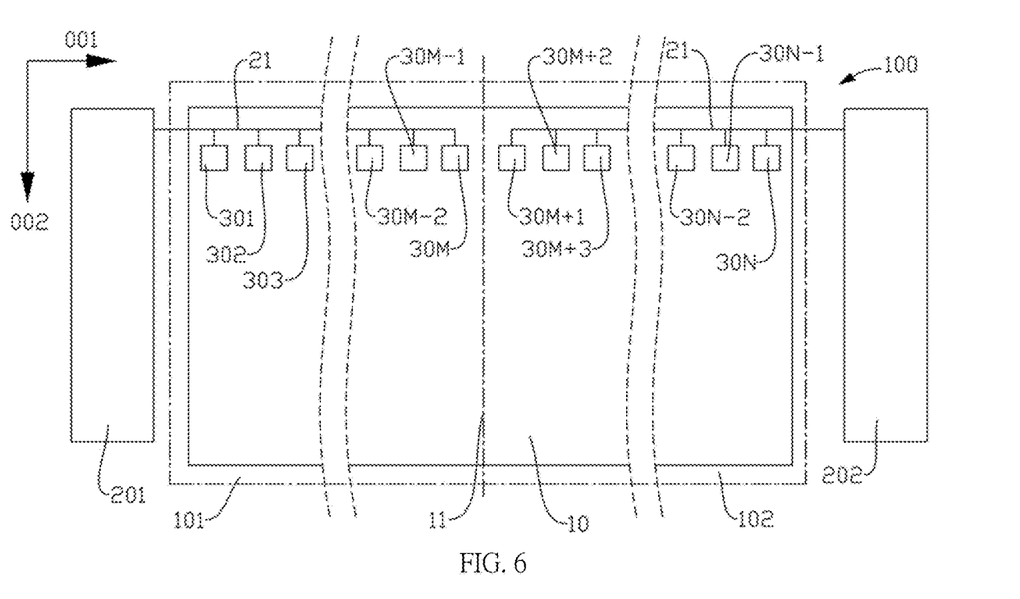
FIG. 6 is a schematic view of the LCD in accordance with another embodiment of the present disclosure.

The embodiment is shown in FIG. 6. The LCD 100 includes two scanning controllers 20, including a first scanning controller 201 and a second scanning controller 202.

The first scanning controller 201 and the second scanning controller 202 are electrically connected to the TFTs 30 in two regions on the substrate 10, respectively. The two regions includes a first region 101 and a second region 102, respectively. It can be understood that the first scanning controller 201 controls the TFT 30 in the first region 101, and the second scanning controller 202 controls the TFT 30 in the second region 102.

In this embodiment, the substrate 10 introduces two of the scanning controllers 20, which can alleviate the load of the single scanning controller 20 and improve the working efficiency of the LCD 100. At this time, the projection area 310 of the TFT 30 in each region is also set in a sequential increment manner. The difference is that the incremental direction of the TFT 30 needs to be set with respect to the distance of the scanning controller 20 electrically connected thereto. That is, the projection area 310 of the TFT 30 in the first region 101 is sequentially increased according to the distance from the first scanning controller 201, and the TFT 30 in the second region 102 is sequentially increased. The projection area 310 is sequentially increased in accordance with the distance from the second scanning controller 202.

Similarly, a row of the TFTs 30 in FIG. 6 is sequentially located in the first direction 001, including a transistor 301, a transistor 302, a transistor 303, a transistor 30M-2, and a transistor 30M located in the first region 101. The transistor 30M+1, transistor 30M+2, transistor 30M+3, ... transistor 30N-2, transistor 30N-1 and transistor 30N are located in the second region 102. Correspondingly, the side 011 of each of the TFTs 30 has a size L. Then, the size of the side 011 of the entire row of the TFTs 30 should satisfy the following conditions:

$$L301<L302<L303<\ldots L30M-2<L30M-1<L30M;$$

$$L30M+1>L30M+2>L30M+3>\ldots L30N-2>L30N-1>L30N.$$

Further, the first scanning controller 201 and the second scanning controller 202 divide the two sides of the substrate 10 along the first direction 001, and the two regions of the substrate 10 is divided by a center line 11 in the first direction 001. At this time, the number of the TFTs 30 in the first region 101 and the second region 102 is the same, and the loads of the first scanning controller 201 and the second scanning controller 202 are also the same. This makes it easy to design parameters, such as the power of the first scanning controller 201 and the second scanning controller 202, as long as the two controllers adopt the same settings.

In other words, the LCD 100 can simultaneously drive the substrate 10 by using the scanning controller 20 of the same specification and model. In order to match the loads of the first scanning controller 201 and the second scanning controller 202, a pair of the first region 101 and the second region 102 that are symmetric with respect to the center line 11 may be configured, The TFT 30 is disposed using the symmetric projection area 310. It can be understood that the size of the side 011 of the entire row of the TFTs 30 at this time satisfies the following conditions:

$$L301=L30N<L302=L30N-1<L303=L30N-2<\ldots L30M-2=L30M+3<L30M-1=L30M+2<L30M=L30M+1;$$

Generally, the LCD 100 further includes a data controller 40. The data controller 40 is disposed at one end of the substrate 10 along the second direction 002. The TFT 30 further includes a source 34. The source 34 is in turn electrically coupled to the data controller 40 in the second direction 002. It can be understood that the source 34 is connected to the data controller 40 via a power line, i.e., a data line 41.

Similarly, the data line 41 also has a resistance, and in the process of extending along the second direction 002, the voltage received by the source 34 also has a voltage drop phenomenon. The voltage drop of the source 34 also causes an imbalance in the capacitive coupling effect of the LCD 100. Correspondingly, the projection area 310 of the TFT 30 can also be compensated in such a manner that the distance between the second direction 002 and the data controller 40 increases in sequence.

Specifically, as shown in FIG. 5, a plurality of columns of the TFTs 30 are arranged on the substrate 10 along the second direction 002. The data controller 40 is listed on one side of the substrate 10 in the second direction 002. The TFTs 30 in the second direction 002 may include a transistor 301, a transistor 301-2, a transistor 301-3, a transistor 301-N-2, a transistor 301-N-1, and a transistor 301-N. Correspondingly, the side 011 of each of the TFTs 30 has a size L. Then, the size of the side 011 of the entire row of the TFTs 30 should satisfy the following conditions:

$$L301<L301-2<L301-3<\ldots L301-N-2<L301-N-1<L301-N;$$

It can be understood that the beneficial effect of the setting on the second direction 002 is similar to the similar effect of the similar setting in the first direction 001, and will not be further described herein.

For the source 34 and the drain 32, generally, the source 34 needs to be disposed opposite to the drain 32 to increase the efficiency of the gate 31 when the source 34 and drain 32 are turned on. A channel 35 is disposed between the source 34 and the drain 32. The length of the channel 35 is determined by the electrical parameters of the TFT 30. In one embodiment, in order to ensure that the electrical parameters of the TFT 30 are stable, the length of the channel 35 remains unchanged in the case where the projection area 310 changes along the second direction 002.

On the other hand, the length of the channel 35 has a large influence on the on-state current of the TFT 30. The greater the length of the channel 35 is, the smaller the on-state current of the TFT 30 is. The on-state current of the TFT 30 can affect the voltage drop of the TFT 30. That is, the length of the channel 35 is reduced, and the capacitive coupling effect caused by the voltage drop of the TFT 30 can be increased, thereby achieving an uniform effect of the brightness of the LCD 100. In other embodiments, the further the distance from the data controller 40 along the second direction 002, the length of the channel 35 of the TFT 30 gradually decreases. The display effect of the LCD 100 can be further balanced by increasing the settings in order.

It can be understood that for the arrangement of the channel 35, similar measures can be taken in the first direction 001, that is, the length of the channel 35 is decreased along the first direction 001 when the projection area 310 of the TFT 30 is gradually increased, and the display effect of the LCD 100 can be further balanced.

Figure 7:
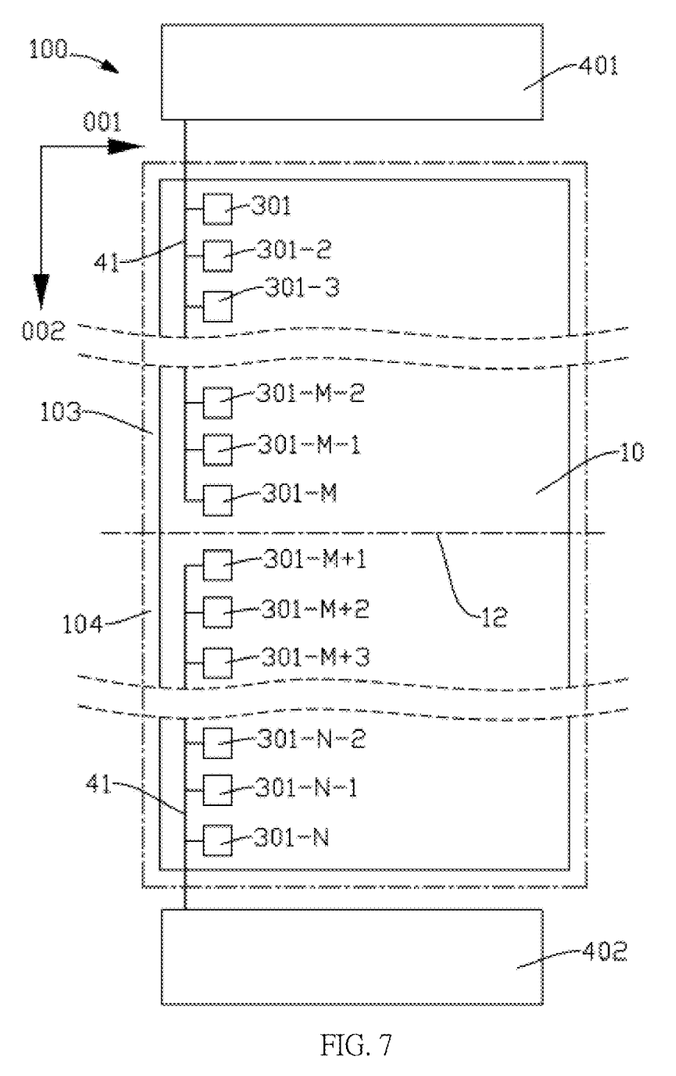
FIG. 7 is a schematic view of the LCD in accordance with another embodiment of the present disclosure.

In FIG. 7, the LCD 100 includes two data controllers 40, including a first data controller 401 and a second data controller 402. Similarly, the two data controllers 40 can alleviate the load of a single data controller 40 and improve the working efficiency of the LCD 100. It can be understood that the first data controller 401 and the second data controller 402 are electrically connected to the TFTs 30 in the two regions on the substrate 10, respectively. The two regions in the substrate 10 are a third region 103 and a fourth region 104, respectively.

The first data controller 401 controls the TFT 30 in the third region 103, and the second data controller 402 controls the TFT 30 in the fourth region 104. Similarly, the projection area 310 of the TFT 30 in each region is also configured in a sequential increment manner. Specifically, the incremental direction of the TFT 30 needs to be configured with respect to the distance of the data controller 40 electrically connected thereto. That is, the projection area 310 of the TFT 30 in the third region 103 is sequentially increased according to the distance from the first data controller 401, and the TFT 30 in the fourth region 104 is sequentially increased. The projection area 310 is sequentially increased in accordance with the distance from the second data controller 402.

The TFTs 30 of one column in FIG. 7 is defined to include a transistor 301, a transistor 301-2, a transistor 301-3, , . . . , a transistor 301-M-2, a transistor 301-M-01, and a transistor 301-M located in the third region 103; and a transistor 301-M+1, a transistor 301-M+2, a transistor 301-M+3, . . . , a transistor 301-N-2, a transistor 301-N-1, and a transistor 301-N located in the fourth region 104. Correspondingly, the side 011 of each of the TFTs 30 has a size L. Then, the size of the side 011 of the entire row of the TFTs 30 should satisfy the following conditions:

$$L301<L301\text{-}2<L301\text{-}3< \ldots L301\text{-}M\text{-}2<L301\text{-}M\text{-}1<L301\text{-}M$$

$$L301\text{-}M+1>L30M1\text{-}+2>L301\text{-}M+3> \ldots L301\text{-}N\text{-}2>L301\text{-}N\text{-}1>L301\text{-}N;$$

Similarly, the first data controller 401 and the second data controller 402 are arranged on both sides of the substrate 10 along the second direction 002, and the substrate 10 is divided by a center line 12 along the second direction 002. At this time, the number of the TFTs 30 in the third region 103 and the fourth region 104 is the same. The loads of the first data controller 401 and the second data controller 402 are also the same. The LCD 100 is designed such that the data controller 40 of the same specification and size can be used to simultaneously drive the substrate 10.

In order to match the loads of the first data controller 401 and the second data controller 402, the third region 103 and the fourth region 104 may be symmetric with respect to the center line 12. A pair of the TFTs 30 are disposed symmetrically with the projection area 310. At this time, the size of the side 011 of the entire row of the TFTs 30 satisfies the following conditions:

$$L301=L301\text{-}N<L301\text{-}2=L301\text{-}N\text{-}1<L301\text{-}3=L301\text{-}N\text{-}2< \ldots L301\text{-}M\text{-}2=L301\text{-}M+3<L301M\text{-}1=L301\text{-}M+2<L301\text{-}M=L301\text{-}M+1;$$

The present application also relates to a mobile terminal 200. The mobile terminal 200 includes the LCD 100 of the present application. It can be understood that the display equalization of the mobile terminal 200 is improved due to the above technical solution, and can provide a better viewing effect and enhance the product experience.

Above are embodiments of the present invention, which does not limit the scope of the present invention. Any equivalent amendments within the spirit and principles of the embodiment described above should be covered by the protected scope of the invention.

What is claimed is:

1. A liquid crystal display (LCD), comprising:
a substrate and a scanning controller, the substrate being configured with a plurality of thin film transistors (TFTs), each of the TFTs comprising a gate, a drain and a pixel electrode, the gate of each of the TFTs electrically connecting to the scanning controller along a first direction in sequence, one end of the drain connecting to the pixel electrode, and the other end of the drain being a part of the drain that is stacked on the gate and insulated from the gate so that the part of the drain casts a projection on the gate along a third direction perpendicular to the substrate, the projections that the parts of the drains of the plurality of TFTs cast on the gates of the plurality of the TFTs having projection areas that are different from each other,
wherein for multiple TFTs of the plurality of TFTs that are arranged away from the scanning controller in the first direction with distances increasing from the scanning controller, the projection areas of the projections that the parts of the drains of the multiple TFTs cast on the gates of the multiple TFTs are increased one by one in the first direction with the increase of the distances of the multiple TFTs away from scanning controller.

2. The LCD as claimed in claim 1, wherein a stacked area of the drain and the gate in the third direction is a rectangle, two adjacent sides of the rectangle respectively extends along the first direction and a second direction, the second direction is perpendicular to the first direction, a length of the side extending along the first direction remains the same when the dimension of the projection area has been increased.

3. The LCD as claimed in claim 2, wherein the LCD further comprises two scanning controllers respectively connecting to the TFTs in two regions of the substrate to control the TFTs, and the projection area of the TFTs in each of the regions is configured to be in a sequential increment manner basing on a distance between the TFT and the connected scanning controller.

4. The LCD as claimed in claim 3, wherein the two scanning controllers are respectively configured at two sides defined by the first direction, the two regions of the substrate is divided by a center line in the first direction such that at least one pair of TFTs are respectively configured at the corresponding locations in the two regions with respect to the center line, and the dimensions of the projection area of the two corresponding TFTs are the same.

5. The LCD as claimed in claim 2, wherein the LCD further comprises a data controller, the TFT comprises a source, the data controller electrically connects to the source along the second direction in turn, and the dimensions of the projection areas of the TFTs are configured to be increased in turn, along the second direction, according to the distance between the TFT and the data controller.

6. The LCD as claimed in claim 4, wherein the source is opposite to the drain, and a channel is disposed between the source and the drain, and a length of the channel remains the same.

7. The LCD as claimed in claim 4, wherein the source is opposite to the drain, and a channel is disposed between the source and the drain, and a length of the channel is configured to be gradually decreased when the dimension of the projection area has been gradually increased.

8. The LCD as claimed in claim 6, wherein the LCD comprises two data controllers electrically connecting to the TFTs in the two regions of the substrate so as to control the TFTs, and the dimension of the projection area of each of the TFTs in the two regions has been gradually increased according to the distance between the TFT and the connected data controller.

9. The LCD as claimed in claim 7, wherein the LCD comprises two data controllers electrically connecting to the TFTs in the two regions of the substrate so as to control the TFTs, and the dimension of the projection area of each of the TFTs in the two regions has been gradually increased according to the distance between the TFT and the connected data controller.

10. The LCD as claimed in claim 8, wherein the two scanning controllers are respectively configured at two sides defined by the second direction, the two regions of the substrate is divided by a center line in the second direction such that at least one pair of TFTs are respectively configured at the corresponding locations in the two regions with respect to the center line, and the dimensions of the projection area of the two corresponding TFTs are the same.

11. A mobile terminal, comprising:
a liquid crystal device (LCD) comprising a substrate and a scanning controller, the substrate being configured with a plurality of thin film transistors (TFTs), each of the TFTs comprising a gate, a drain and a pixel electrode, the gate of each of the TFTs electrically connecting to the scanning controller along a first direction in sequence, one end of the drain connecting to the pixel electrode, and the other end of the drain being a part of the drain that is stacked on the gate and insulated from the gate so that the part of the drain casts a projection on the gate along a third direction perpendicular to the substrate, the projections that the parts of the drains of the plurality of TFTs cast on the gates of the plurality of the TFTs having projection areas that are different from each other,
wherein for multiple TFTs of the plurality of TFTs that are arranged away from the scanning controller in the first direction with distances increasing from the scanning controller, the projection areas of the projections that the parts of the drains of the multiple TFTs cast on the gates of the multiple TFTs are increased one by one in the first direction with the increase of the distances of the multiple TFTs away from scanning controller.

12. The mobile terminal as claimed in claim 11, wherein a stacked area of the drain and the gate in the third direction is a rectangle, two adjacent sides of the rectangle respectively extends along the first direction and a second direction, the second direction is perpendicular to the first direction, a length of the side extending along the first direction remains the same when the dimension of the projection area has been increased.

13. The mobile terminal as claimed in claim 12, wherein the LCD further comprises two scanning controllers respectively connecting to the TFTs in two regions of the substrate to control the TFTs, and the projection area of the TFTs in each of the regions is configured to be in a sequential increment manner basing on a distance between the TFT and the connected scanning controller.

14. The mobile terminal as claimed in claim 13, wherein the two scanning controllers are respectively configured at two sides defined by the first direction, the two regions of the substrate is divided by a center line in the first direction such that at least one pair of TFTs are respectively configured at the corresponding locations in the two regions with respect to the center line, and the dimensions of the projection area of the two corresponding TFTs are the same.

15. The mobile terminal as claimed in claim 12, wherein the LCD further comprises a data controller, the TFT comprises a source, the data controller electrically connects to the source along the second direction in turn, and the dimensions of the projection areas of the TFTs are configured to be increased in turn, along the second direction, according to the distance between the TFT and the data controller.

16. The mobile terminal as claimed in claim 14, wherein the source is opposite to the drain, and a channel is disposed between the source and the drain, and a length of the channel remains the same.

17. The mobile terminal as claimed in claim 14, wherein the source is opposite to the drain, and a channel is disposed between the source and the drain, and a length of the channel is configured to be gradually decreased when the dimension of the projection area has been gradually increased.

18. The mobile terminal as claimed in claim 16, wherein the LCD comprises two data controllers electrically connecting to the TFTs in the two regions of the substrate so as to control the TFTs, and the dimension of the projection area of each of the TFTs in the two regions has been gradually increased according to the distance between the TFT and the connected data controller.

19. The mobile terminal as claimed in claim 17, wherein the LCD comprises two data controllers electrically connecting to the TFTs in the two regions of the substrate so as to control the TFTs, and the dimension of the projection area of each of the TFTs in the two regions has been gradually increased according to the distance between the TFT and the connected data controller.

20. The mobile terminal as claimed in claim 18, wherein the two scanning controllers are respectively configured at two sides defined by the second direction, the two regions of the substrate is divided by a center line in the second direction such that at least one pair of TFTs are respectively configured at the corresponding locations in the two regions with respect to the center line, and the dimensions of the projection area of the two corresponding TFTs are the same.

* * * * *